W. COX & P. R. PETERSON.
TRANSOM HOLDER.
APPLICATION FILED DEC. 5, 1907.
959,843.
Patented May 31, 1910.
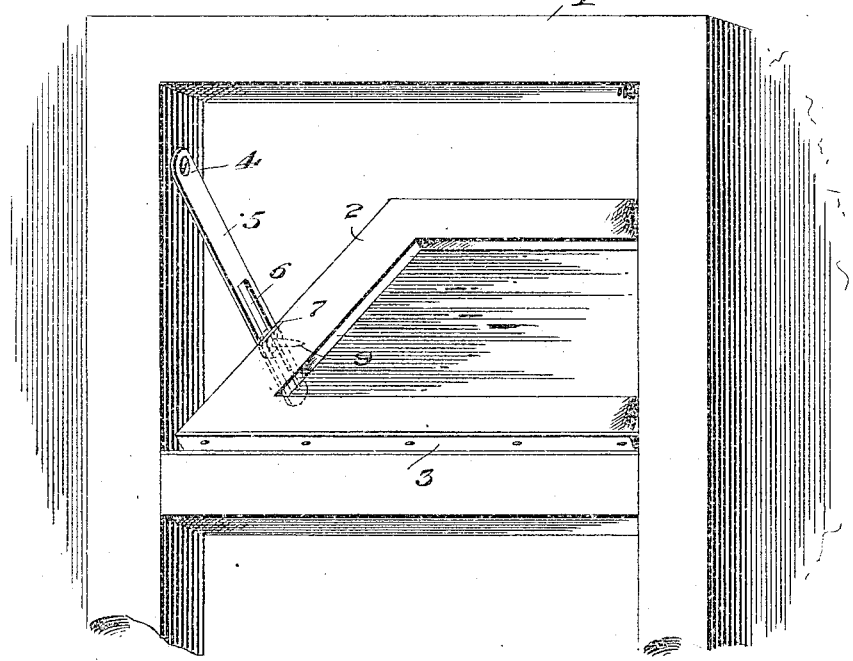
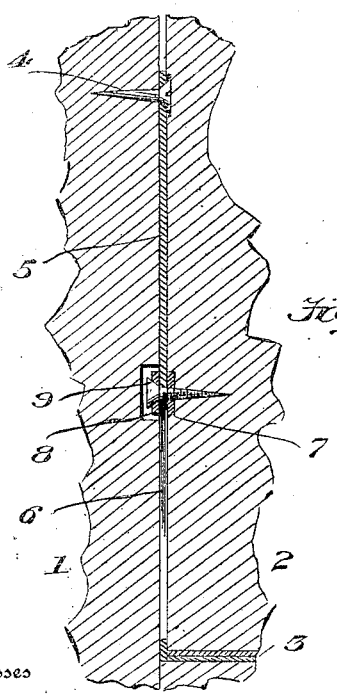
Witnesses
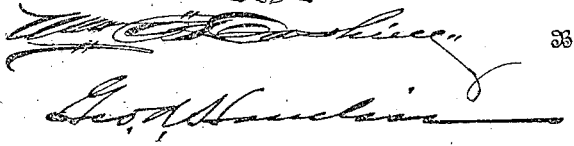
Inventors:
Walter Cox
Peter R. Peterson
By Henry N. Copp
their Attorney
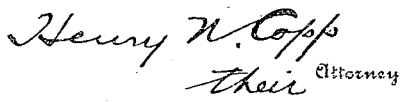

959840
959841
959842